United States Patent [19]
Lutz et al.

[11] Patent Number: 5,705,862
[45] Date of Patent: Jan. 6, 1998

[54] CONFIGURABLE PANELBOARD FOR A PLURALITY OF ELECTRICAL SWITCHING APPARATUS

[75] Inventors: David A. Lutz, Oakdale, Pa.; Mark A. Satterthwaite; Daniel B. Yount, both of Sumter, S.C.; Bruce L. Brodsky, Bridgeville, Pa.; David L. Davidson, Batavia; Daniel W. Shafer, St. Charles, both of Ill.

[73] Assignee: Eaton Corporation, Cleveland, Ohio

[21] Appl. No.: 646,527

[22] Filed: May 7, 1996

[51] Int. Cl.⁶ ................................................. H02B 1/01
[52] U.S. Cl. .................. 307/148; 361/601; 361/627; 361/659; 364/492
[58] Field of Search ......................... 307/147; 364/487, 364/481, 492, 140; 361/601, 659, 627, 641

[56] References Cited

U.S. PATENT DOCUMENTS

| | | | |
|---|---|---|---|
| 4,553,115 | 11/1985 | Grunert et al. | 335/14 |
| 4,642,726 | 2/1987 | Matsko et al. | 361/198 |
| 4,654,614 | 3/1987 | Chien et al. | 335/201 |
| 4,833,600 | 5/1989 | Brodsky | 364/200 |
| 4,887,057 | 12/1989 | Gula et al. | 335/190 |
| 4,918,566 | 4/1990 | Brodsky et al. | 361/166 |
| 4,920,476 | 4/1990 | Brodsky et al. | 364/140 |
| 5,184,278 | 2/1993 | Jordan et al. | 361/346 |
| 5,200,724 | 4/1993 | Gula et al. | 335/166 |
| 5,231,565 | 7/1993 | Bilas et al. | 364/140 |
| 5,233,511 | 8/1993 | Bilas et al. | 364/146 |
| 5,341,191 | 8/1994 | Crookston et al. | 335/16 |
| 5,373,411 | 12/1994 | Grass et al. | 361/64 |
| 5,394,296 | 2/1995 | Erickson et al. | 361/659 |
| 5,455,760 | 10/1995 | Bilas et al. | 364/140 |

OTHER PUBLICATIONS

"Integrated Building Solutions—Redefining Facility Management—Synergy 7000 Automated Facility Management System," *Integrated Building Solutions, Inc.*, pp. 1–48, Jun. 1994.

"Integrated Building Solutions—Synergy System Overview," *Integrated Building Solutions, Inc.*, 49 pp., Jun. 1994.

"The Power to Control Power—1000 Series—Custom Configurable, Networkable Lighting Controllers with Programmable Timing & Matrixing," *MicroLite Corporation*, D33–07, Revision B, 4 pp., Apr. 1993.

"Technology Today—Power Switching—Smart Panelboards," *Integrated Building Solutions, Inc.*, 10 pp., 1994.

*Primary Examiner*—William M. Shoop, Jr.
*Assistant Examiner*—Albert W. Paladini
*Attorney, Agent, or Firm*—Martin J. Moran

[57] ABSTRACT

A panelboard apparatus includes an enclosure; a first plurality of circuit breakers including a remotely controllable solenoid for actuating the circuit breaker and switching a circuit from a power line through a load; a holder for holding in the enclosure up to a second plurality of circuit breakers including the first plurality of circuit breakers; a controller for controlling up to the second plurality of circuit breakers; a printed circuit connection mechanism for connecting up to the second plurality of circuit breakers to the controller in one of a plurality of configurations, including printed circuit boards having a plurality of interfaces for up to the second plurality of circuit breakers; and a switch selection circuit for selecting one of the configurations in order to determine a location in the enclosure of a first one of the second plurality of circuit breakers.

18 Claims, 11 Drawing Sheets

CONFIGURABLE PANELBOARD FOR A PLURALITY OF ELECTRICAL SWITCHING APPARATUS

BACKGROUND OF THE INVENTION

1. Field of the Invention

This invention is directed to communication and control systems and, more particularly, to control of a panelboard, such as a lighting panelboard.

2. Background Information

A panelboard holds a plurality of electrical switching devices each of which is connected between a power source and a separate load.

Electrical switching devices include, for example, circuit switching devices and circuit interrupters, such as circuit breakers, contactors, motor starters and motor controllers. Circuit breakers are generally old and well known in the art. Examples of circuit breakers are disclosed in U.S. Pat. Nos. 4,553,115; 4,642,726; 4,654,614; 4,887,057; 5,200,724; and 5,341,191. Such circuit breakers are used to protect electrical circuitry from damage due to an overcurrent condition, such as an overload condition or a relatively high level short circuit condition.

Molded case circuit breakers, for example, include a pair of separable contacts per phase; an operating mechanism designed to rapidly open and close the separable contacts; a handle disposed on the outside of the case for operating the operating mechanism manually; and a trip mechanism for tripping the operating mechanism automatically in response to an overcurrent condition.

Some circuit breakers employ a solenoid having a plunger for engaging the trip mechanism along with a remotely controllable coil for energizing the solenoid. Some circuit breakers employ a status contact for reporting the status of the separable contacts of the circuit breaker.

It is known to employ electronic control, such as a computer, for controlling the solenoids of a plurality of circuit breakers in a panelboard. It is also known to employ the computer to monitor the status of the circuit breakers in a panelboard from the status contacts.

It is further known to provide a panelboard for up to a fixed number (e.g., 42) of circuit breakers. In the event that fewer than such fixed number of circuit breakers are required, then a smaller number of circuit breakers are employed in the fixed size panelboard. It is also known to provide a plurality of different panelboard styles for up to a fixed number (e.g., 18, 24, 42) of circuit breakers, with a first circuit breaker typically located in the upper left portion of each panelboard style. However, each of the different panelboard styles requires a different set of connections between the computer and each different fixed number of circuit breakers.

There is a need, therefore, for an improved panelboard which simplifies the connections between a computer and a variable number of electrical switching devices.

There is a more particular need for such an improved panelboard which locates a first circuit breaker in the same general location with respect to the panelboard enclosure.

There is another more particular need for such an improved panelboard which reduces manufacturing costs.

SUMMARY OF THE INVENTION

These and other needs are satisfied by the invention which is directed to a panelboard apparatus including an enclosure; at least one electrical switching apparatus; means for holding in the enclosure up to a plurality of electrical switching apparatus including the at least one electrical switching apparatus; control means for controlling up to the plurality of electrical switching apparatus, at least some of which include a remotely controllable actuating means for actuating a corresponding one of the plurality of electrical switching apparatus and switching a circuit from a power line through a load; connection means for connecting up to the plurality of electrical switching apparatus including the actuating means of the at least one electrical switching apparatus to the control means in one of a plurality of configurations, including at least one interface means having a plurality of interfaces for up to at least some of the plurality of electrical switching apparatus including the at least one electrical switching apparatus; and selection means for selecting one of the configurations in order to determine a location in the enclosure of a first one of the at least one electrical switching apparatus.

As another aspect of the invention, a panelboard apparatus, for use in an integrated building electrical load management system with a first plurality of electrical switching apparatus, includes an enclosure; a second plurality, less than or equal to the first plurality, of electrical switching apparatus; means for holding in the enclosure up to the first plurality of electrical switching apparatus including the second plurality of electrical switching apparatus; control means for controlling up to the first plurality of electrical switching apparatus, at least some of which include a remotely controllable actuating means for actuating a corresponding one of the first plurality of electrical switching apparatus and switching a circuit from a power line through a load; connection means for connecting up to the first plurality of electrical switching apparatus including the actuating means of the second plurality of electrical switching apparatus to the control means in one of a plurality of configurations, including at least one interface means having a plurality of interfaces for up to at least some of the first plurality of electrical switching apparatus including the second plurality of electrical switching apparatus; and selection means for selecting one of the configurations in order to determine a location in the enclosure of a first one of the second plurality of electrical switching apparatus.

BRIEF DESCRIPTION OF THE DRAWINGS

A full understanding of the invention can be gained from the following description of the preferred embodiment when read in conjunction with the accompanying drawings in which.

DESCRIPTION OF THE PREFERRED EMBODIMENT

Figure 1:
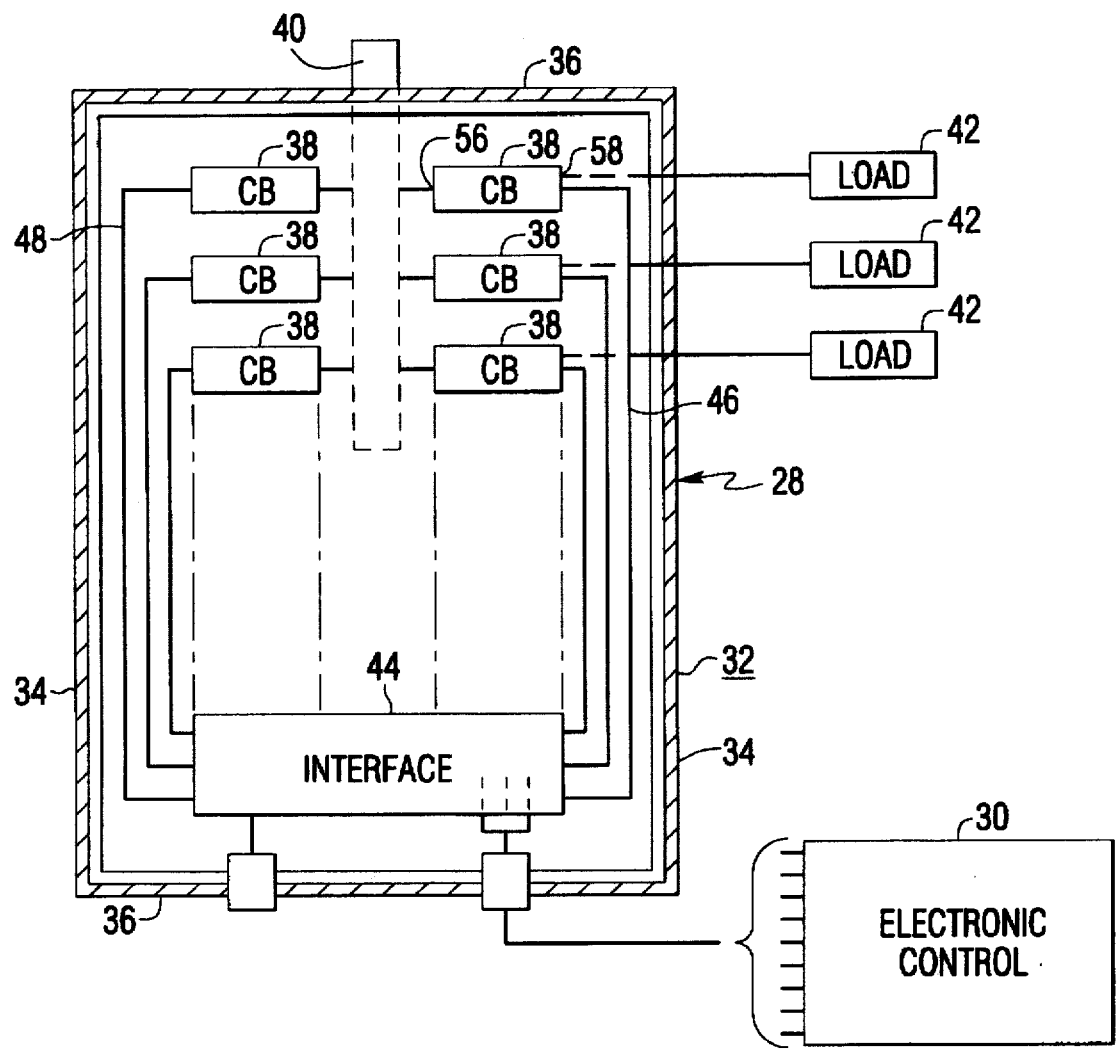
FIG. 1 is a block diagram of a panelboard having a plurality of circuit breakers and electronic control for the panelboard.

A prior art structure for panelboard electronic control is illustrated in FIG. 1. A panelboard 28 interfaces external electronic control, such as a computer 30. The panelboard includes a box or enclosure 32 having opposite sidewalls 34 and end walls 36; and up to 42 circuit breakers (CB) 38 each of which is connected to a line bus bar 40 and a separate load 42 (as shown with three of the circuit breakers 38). The circuit breakers 38 include solenoid operated circuit breakers, which are interconnected with an interface printed circuit board 44 by separate conductor sets, such as conductor sets 46, 48, for each of the circuit breakers 38, although non-solenoid operated circuit breakers may also be employed where control by the computer 30 is not necessary.

Figure 8:
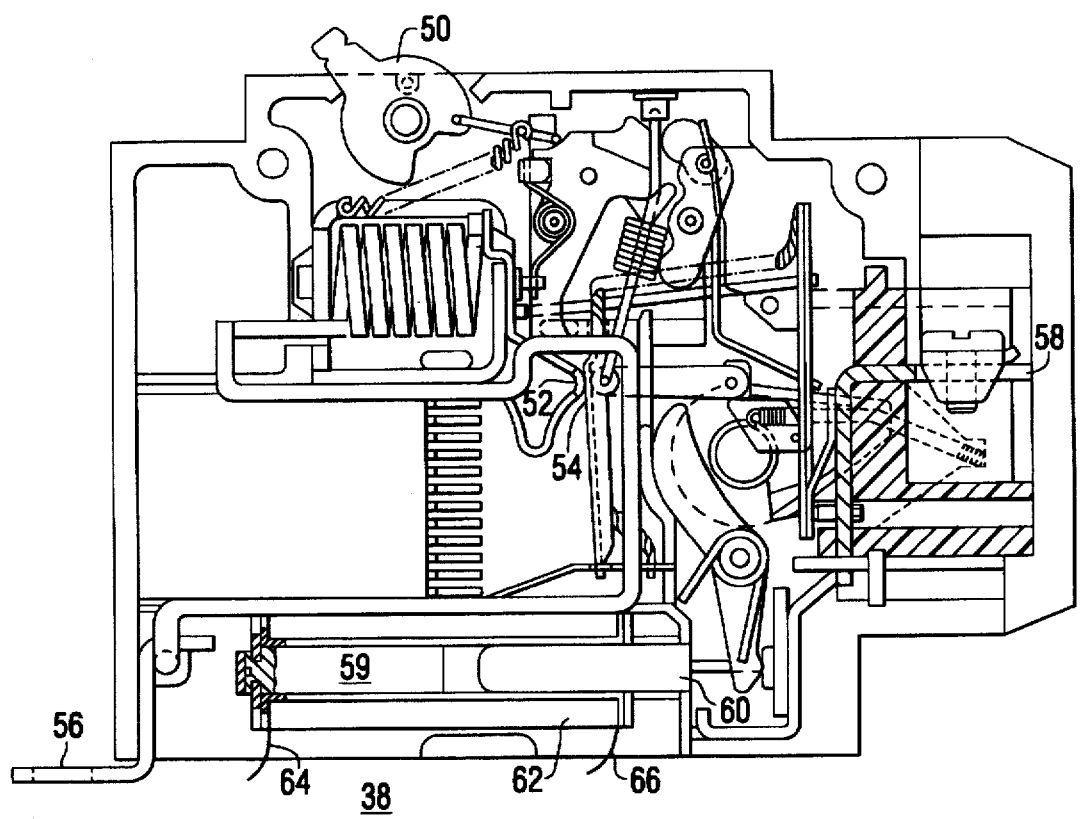
FIG. 8 is a sectional view through a remotely controlled solenoid operated circuit breaker.

Referring to FIG. 8, a typical solenoid operated circuit breaker 38 is shown. Examples of the circuit breaker 38 are disclosed in U.S. Pat. Nos. 4,553,115; 4,642,726; and 4,654, 614 which are incorporated by reference herein. The circuit breaker 38 comprises a manually operated handle 50 for opening and closing separable contacts 52, 54 which are disposed between line and load terminals 56 and 58, respectively. An actuating mechanism, such as solenoid 59, has a plunger 60 for operating on mechanisms within the circuit breaker 38 in a well-known manner for opening and closing the contacts 52, 54 by remote control by a coil 62 having conductor leads 64, 66.

Referring to FIGS. 1 and 8, a circuit to the load 42 may be opened or closed remotely by the plunger 60 of the solenoid 59 in response to operation of the electronic control 30 acting through the interface 44. Each of the conductor sets 46, 48 includes the coil leads 64, 66, which facilitate sending open and close control messages from the computer 30 to the corresponding circuit breaker 38, and a separate status line (e.g., from the status contact 200 of FIG. 5A) which provides a report-back function to monitor the open or closed status of the circuit breaker 38.

Figure 2:
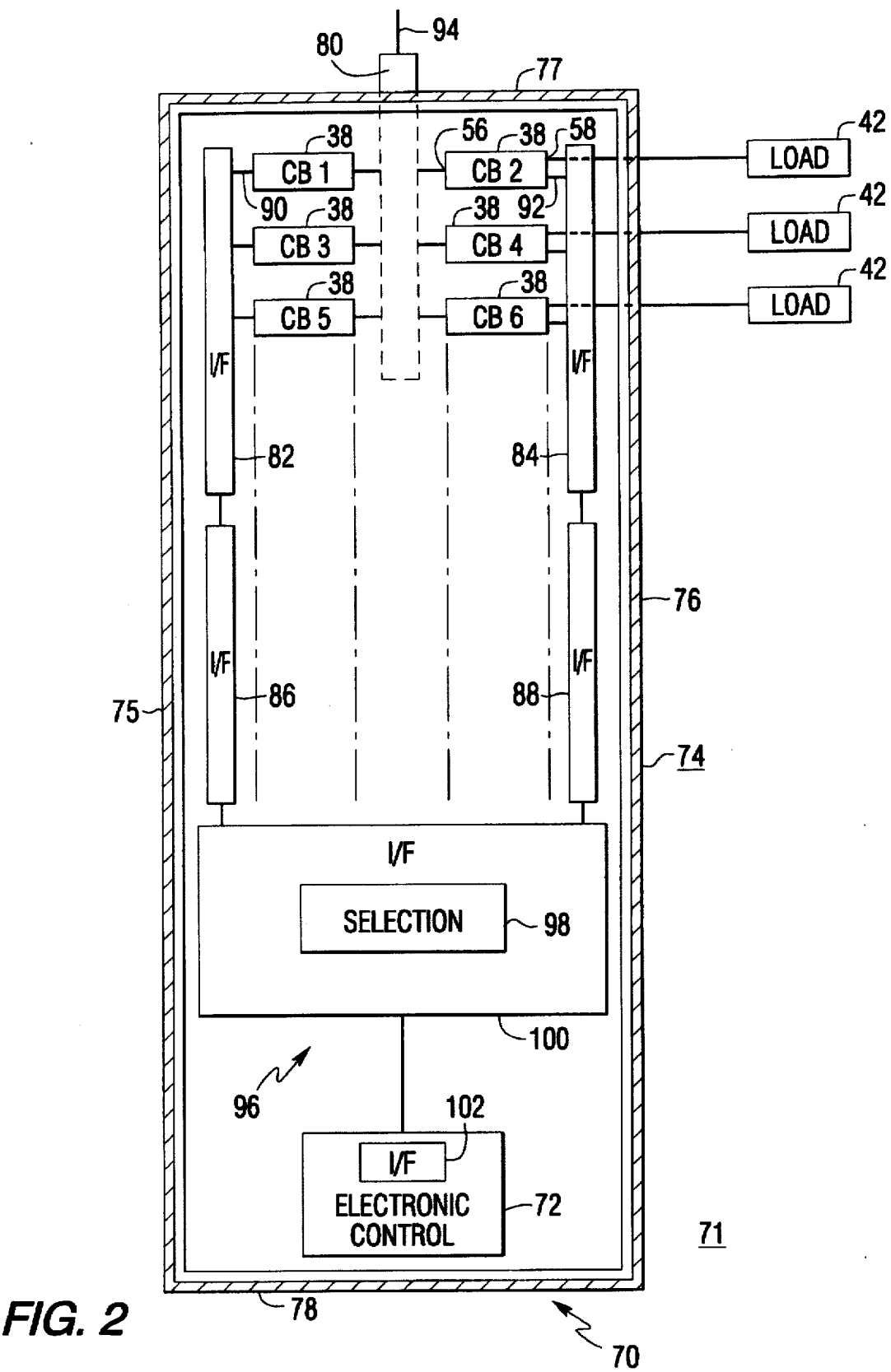
FIG. 2 is a block diagram of an improved panelboard having a plurality of circuit breakers and electronic control in accordance with the invention.

FIG. 2 illustrates an improved panelboard 70 in accordance with the present invention which is employed in an exemplary integrated building electrical load management system 71. The exemplary panelboard 70 includes electronic control, such as a computer 72, for controlling and/or monitoring the circuit breakers 38; a box or enclosure 74 having opposite sidewalls 75, 76 and end walls 77, 78; and from one up to 42 circuit breakers (CB) 38 each of which is connected to a line bus bar 80 through the line terminal 56 thereof and to a separate load 42 through the load terminal 58 thereof (as shown with CB 2), although the invention is applicable to various types and numbers of electrical switching devices and circuit interrupters, and also, to various types of electronic control such as microprocessor based controllers, application specific controllers and other processors for controlling and/or monitoring electrical switching apparatus. An example of an external computer for a panelboard is disclosed in U.S. Pat. No. 4,918,566 which is incorporated by reference herein. The circuit breakers 38 include solenoid operated circuit breakers, which are interconnected with circuit breaker interface printed circuit boards 82, 84, 86, 88 by separate conductor sets, such as conductor sets 90, 92, for each of the circuit breakers 38, although non-solenoid operated circuit breakers may also be employed where control by the computer 72 is not necessary. The solenoid 59 (shown in FIG. 8) of the circuit breakers 38, when energized by the coil 62 thereof, actuates the circuit breaker 38 and switches a circuit from a power line 94, suitably connected to the line bus bar 80, to the corresponding load 42.

As shown in FIG. 2, the exemplary enclosure 74 holds six circuit breakers 38 (CB 1, CB 2, CB 3, CB 4, CB 5 and CB 6), which is less than the maximum number of 42. Preferably, the enclosure 74 holds up to about half of the up to 42 circuit breakers 38 on the left and right sides thereof, with odd groups (e.g., CB 1, CB 3, CB 5) of the circuit breakers 38 located on the left side and even groups (e.g., CB 2, CB 4, CB 6) of the circuit breakers 38 located on the right side. The exemplary computer 72 is located toward the lower end of the enclosure 74 at about the end wall 78.

The panelboard 70 further includes a connection mechanism 96 for connecting up to the 42 circuit breakers 38 to the computer 72 in one of a plurality of configurations, and a selection mechanism 98. The mechanisms 96, 98 are explained in greater detail below in connection with FIGS. 3, 4, 5A–5B, 6A–6B. The connection mechanism 96 includes a row interface board 100, explained in greater detail below in connection with FIG. 4, and the interface printed circuit boards 82, 84, 86, 88, explained in greater detail below in connection with FIGS. 5A–5B, 6A–6B. Although four interface printed circuit boards 82–88 are shown, the invention is applicable to one or more of such boards for interfacing a wide number of electrical switching apparatus in a variety of configurations. The selection mechanism 98, explained in greater detail below in connection with FIG. 4, selects one of the configurations in order that CB 1 is located toward the upper left of the enclosure 74 for each of the configurations. The computer 72 includes an interface (I/F) 102, explained in greater detail below in connection with FIG. 3, which addresses up to the 42 exemplary circuit breakers 38 in seven groups of 6 circuit breakers.

Figure 3:
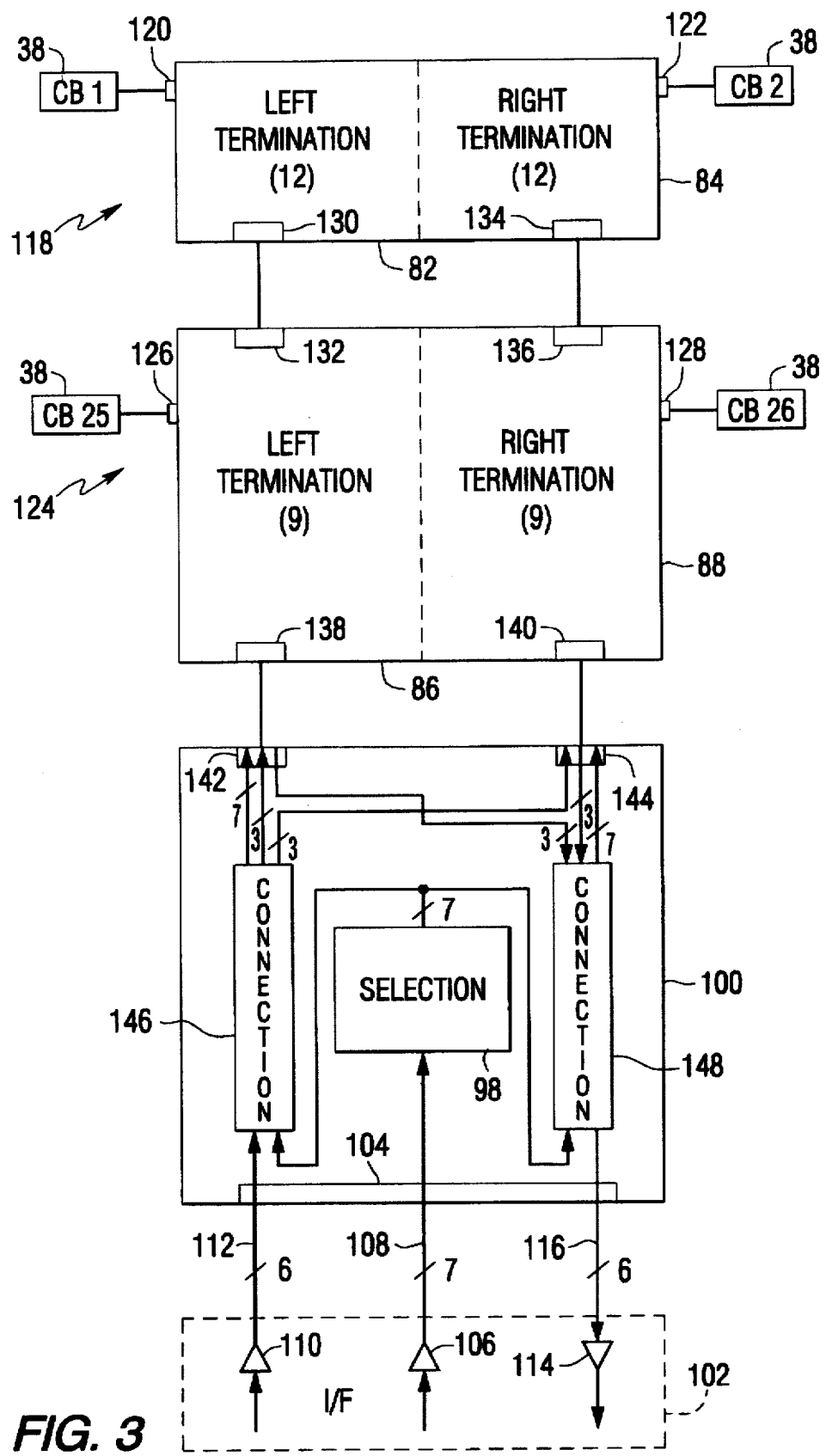
FIG. 3 is a block diagram of various panelboard interfaces between the electronic control and circuit breakers of FIG. 2.

Referring to FIG. 3, various panelboard interfaces between the interface 102 of the computer 72 of FIG. 2 and the circuit breakers 38 is illustrated. The interface 102 is suitably connected to a connector 104 of the row interface board 100. The interface 102 has drivers 106 for at least seven group address lines 108 (GP-A through GP-G); drivers 110 for at least six row control lines 112 (ROW1 through ROW6); and receivers 114 for at least six row status lines 116 (ROW1-STAT through ROW6-STAT). The exemplary seven group address lines 108 address seven groups of six of the circuit breakers 38. One of the 42 (i.e., 42=7×6) exemplary circuit breakers 38 may be controlled through a corresponding combination of one of the seven group address lines 108 and one of the six row control lines 112. Similarly, one of the 42 exemplary circuit breakers 38 may be monitored through a corresponding combination of one of the seven group address lines 108 and one of the six row status lines 116.

The exemplary interface boards 82, 84 provide an interface 118 to 24 circuit breakers 38, including CB 1 through CB 6 of FIG. 2. For example, interface board 82 provides a termination interface 120 to CB 1 on the left side of the enclosure 74 of FIG. 2 and interface board 84 provides a termination interface 122 to CB 2 on the right side of such enclosure 74. The exemplary interface boards 86, 88 provide an interface 124 to 18 circuit breakers 38. For example, interface board 86 provides a termination interface 126 to CB 25 on the left side of the enclosure 74 and interface board 88 provides a termination interface 128 to CB 26 on the right side of such enclosure 74. The interface boards 82, 86 have connectors 130, 132, respectively, which provide a suitable interconnection therebetween. The interface boards 84, 88 have connectors 134, 136, respectively, which provide a similar interconnection. The interface boards 86, 88 also have connectors 138, 140, respectively, which provide a suitable interconnection with connectors 142, 144, respectively, of the row interface board 100. As explained in greater detail below in connection with FIG. 7, the interface 124 is located generally between the interface 118 and the computer 72 of FIG. 2. As explained in greater detail below in connection with FIG. 4, the row interface board 100 provides two connection circuits 146, 148 between the connector 104 to the interface 102 of the computer 72 and the connectors 142, 144, respectively.

Figure 4:
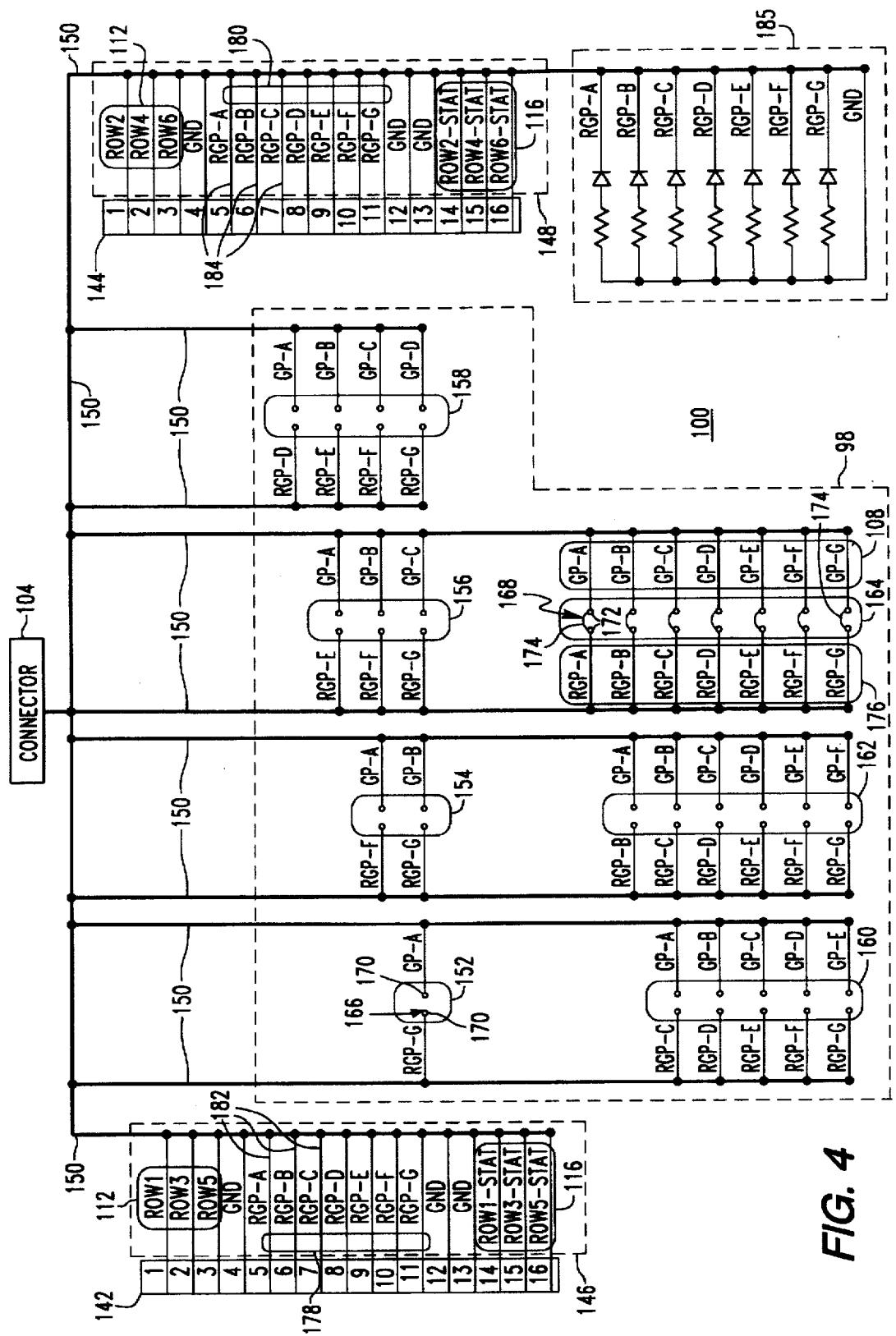
FIGS. 4, 5A-5B and 6A-6B are schematic diagrams of the panelboard interfaces of FIG. 3.

Referring to FIG. 4, a schematic diagram of the row interface board 100 is illustrated. The connector 104 provides a bus 150 which includes the group address lines 108 (GP-A, GP-B, GP-C, GP-D, GP-E, GP-F and GP-G), row control lines 112 (ROW1, ROW2, ROW3, ROW4, ROW5 and ROW6), and row status lines 116 (ROW1-STAT, ROW2-STAT, ROW3-STAT, ROW4-STAT, ROW5-STAT and ROW6-STAT). The selection mechanism 98 includes selection arrays 152, 154, 156, 158, 160, 162 and 164 for configurations of 6, 12, 18, 24, 30, 36 and 42, respectively, of the circuit breakers 38 of FIG. 2. Each of the selection arrays 152–164 corresponds to one of the seven configurations, with the first configuration having six circuit breakers 38, the second configuration having twelve (i.e., 12=2×6) circuit breakers 38, and the seventh configuration having 42 circuit breakers 38.

Each of the selection arrays 152–164 includes at least one switch 166, 168 for at least one of the seven group address lines 108. The exemplary switches 166 and 168 are a jumper socket 170 for a jumper (which is not present), and a jumper socket 172 with a jumper 174 therein, respectively, although the exemplary switches 166, 168 may be any type of switch mechanism (e.g., discrete toggle switches; a dual-in-line package (DIP) switch; soldered-in jumpers; electronic switches; selectively broken printed circuit board, or other, conductors) for selectively electrically connecting one or more signal lines to corresponding signal lines(s). For example, the switch 152 selectively connects the first address line (i.e., GP-A) to the last (i.e., RGP-G) of seven conductors 176 (i.e., RGP-A, RGP-B, RGP-C, RGP-D, RGP-E, RGP-F and RGP-G). The switch 154 selectively connects the first two (i.e., GP-A, GP-B) of the address lines 108 to the last two (i.e., RGP-F, RGP-G, respectively) of the conductors 176, with the second (i.e., GP-B) address line 108 selectively connected to the last (i.e., RGP-G) of the conductors 176. The switch 164 selectively connects the address lines 108 to the conductors 176, with the first address line 108 (i.e., GP-A) connected to the first conductor 176 (i.e., RGP-A), and the last address line 108 (i.e., GP-G) connected to the last conductor 176 (i.e., RGP-G).

The connection circuits 146, 148 include conductor circuits 178, 180, respectively. Each of the conductor circuits 178, 180 includes seven conductors 182, 184, respectively, one for each of the seven conductors 176 and each of the seven address lines 108. The connection circuit 146 also connects three (i.e., ROW1, ROW3, ROW5) of the row control lines 112, three (i. e., ROW1-STAT, ROW3-STAT, ROW5-STAT) of the row status lines 116, and a ground line (GND) from the connector 104 to the connector 142. The connection circuit 148 similarly connects the other three (i.e., ROW2, ROW4, ROW6) of the row control lines 112, the other three (i.e., ROW2-STAT, ROW4-STAT, ROW6-STAT) of the row status lines 116, and the GND line from the connector 104 to the connector 144. The row interface board 100 also includes a clamp circuit 185 which protects the interface 102 of FIG. 3 and limits the negative magnitude of signals on the conductors 176.

Figure 5A:
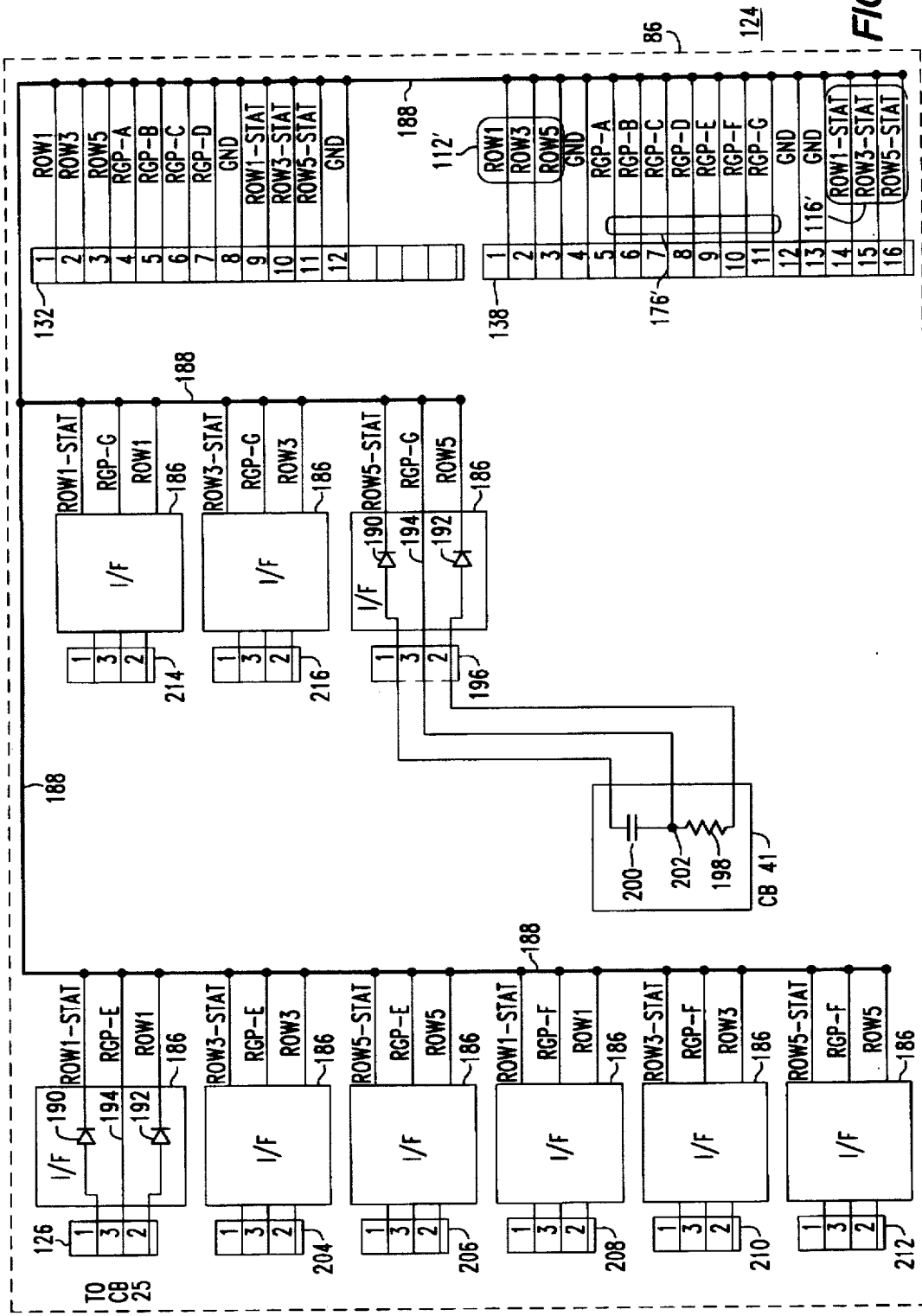
Figure 5B:
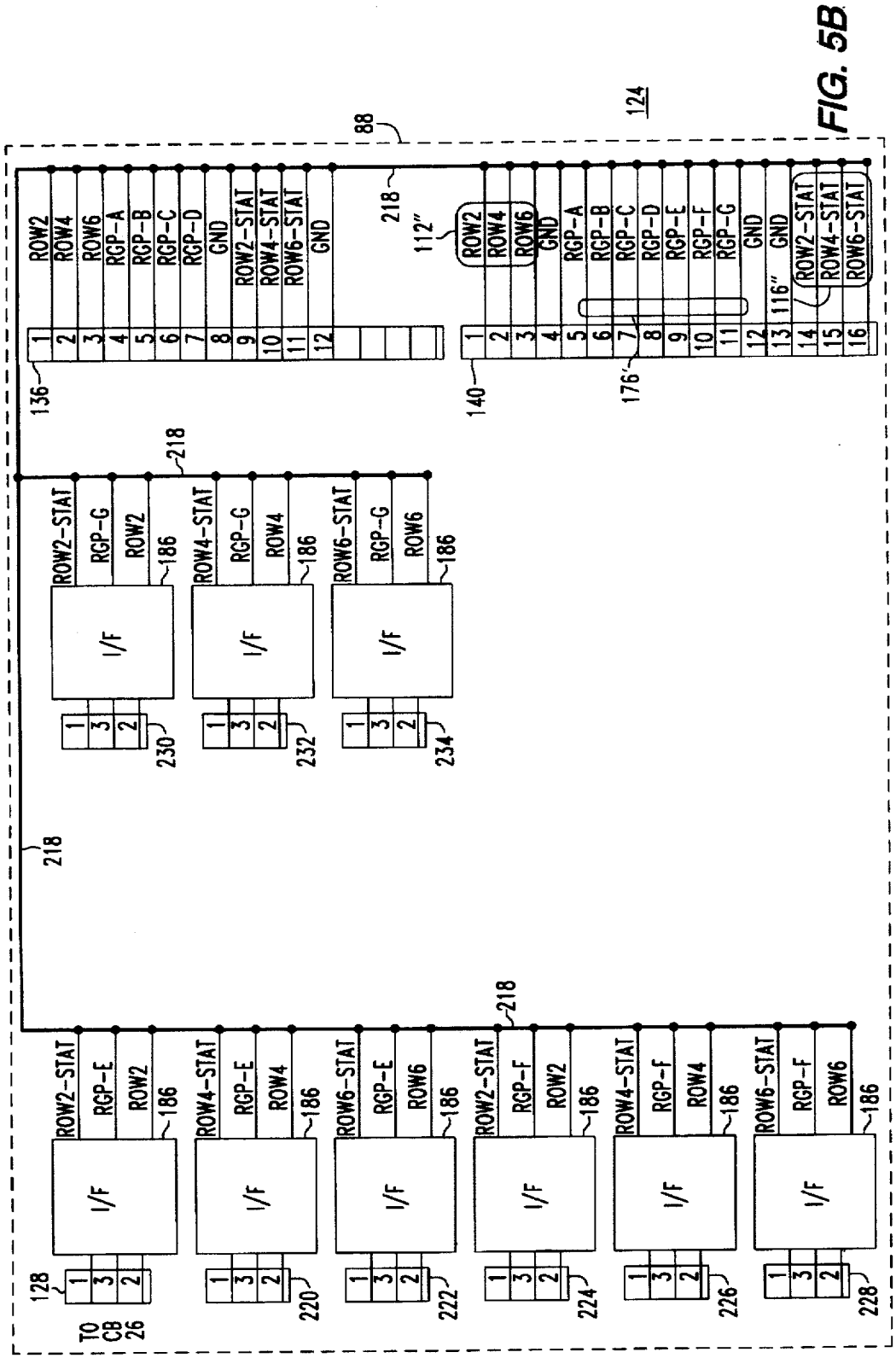

Referring to FIGS. 5A–5B, a schematic diagram illustrates the interface boards 86, 88 which form the interface 124. Each of the exemplary interface boards 86, 88 includes nine interfaces (I/F) 186 and nine connectors, such as the connector 126 which is connected to CB 25 of FIG. 3. The connector 138, which is interconnected with the connector 142 of FIG. 4, provides a bus 188 which includes three odd (i.e., ROW1, ROW3, ROW5) row control lines 112', three odd (i.e., ROW1-STAT, ROW3-STAT, ROW5-STAT) row status lines 116', the GND line, and seven conductors 176' (i.e., RGP-A, RGP-B, RGP-C, RGP-D, RGP-E, RGP-F and RGP-G). Of the seven conductors 176', three (i.e., RGP-E, RGP-F and RGP-G) are employed on the interface board 86, while the other four (i.e., RGP-A, RGP-B, RGP-C and RGP-D) are connected to the connector 132 for interconnection with the connector 130 of the interface board 82 of FIGS. 3 and 6A.

The interface 186 between the connector 126 (for CB 25 of FIG. 3) and the bus 188 includes two diodes 190, 192 and a conductor 194. The same type of interface 186 is provided between the connector 196, which is connected with CB 41, and the bus 188. Each of the interfaces 186 of FIG. 5A interfaces one of the three (i.e., RGP-E, RGP-F and RGP-G) conductors 176' of interface board 86, one of the three odd (i.e., ROW1-STAT, ROW3-STAT, ROW5-STAT) row status lines 116', and one of the three odd (i.e., ROW1, ROW3, ROW5) row control lines 112'. As shown with the connector 196, the CB 41 includes an actuating mechanism 198, such as the solenoid 59 of FIG. 8, and an auxiliary or status contact 200, mechanically linked to the main contacts (e.g., the separable contacts 52, 54 of the circuit breaker 38 of FIG. 8) thereof, for providing a positive indication of the status thereof. The solenoid 198 and the status contact 200 are connected at a common node 202 which, in turn, is connected to the conductor RGP-G 176' by the connector 196 and the conductor 194 of the interface 186 for connector 196. The other end of the solenoid 198 is connected to the odd row control line ROW5 112' by the connector 196 and the diode 192 of such interface 186. The other end of the status contact 200 is connected to the odd row status line ROW5-STAT 116' by the connector 196 and the diode 190 of the interface 186. It will be appreciated that other circuit breakers 38 (e.g., odd numbered circuit breakers numbered 27, 29, 31, 33, 35, 37 and 39, none of which are shown) may be connected to the other connectors 204, 206, 208, 210, 212, 214 and 216, respectively.

Referring to FIGS. 3, 4, 5A–5B, the computer 72 controls a selected one of the circuit breakers 38 by energizing one of the seven group address lines 108 (GP-A through GP-G) with a suitable voltage from one of the drivers 106 corresponding to such selected circuit breaker 38; and by sinking current from such driver 106, through the solenoid 198 of such selected circuit breaker 38, through the diode 192 of the interface 186 corresponding to such selected circuit breaker 38, and into the driver 110 for one of the six row control lines 112 (ROW1 through ROW6) corresponding to such selected circuit breaker 38. The computer 72 also monitors the status of such selected circuit breaker 38 by energizing the status contact 200 of such selected circuit breaker 38 with the selected one of the seven group address lines 108; and by monitoring the voltage therefrom through the diode 190 of the interface 186 corresponding to such selected circuit breaker 38, and into the receiver 114 for one of the six row status lines 116 (ROW1-STAT through ROW6-STAT) corresponding to such selected circuit breaker 38. In this manner, the drivers 106 and receivers 114 of the interface 102 form a circuit for monitoring the status of the circuit breakers 38. Similarly, the interfaces 186 of the interface boards 82-88 and the connection circuits 146, 148 of the row interface board 100 form a circuit for connecting the computer 72 to such circuit for monitoring the circuit breaker status.

Continuing to refer to FIG. 5B, the connector 140 of the interface board 88, which is interconnected with the connector 144 of FIG. 4, provides a bus 218 which includes three even (i.e., ROW2, ROW4, ROW6) row control lines 112", three even (i.e., ROW2-STAT, ROW4-STAT, ROW6-STAT) row status lines 116", the GND line, and the seven conductors 176'. Of the seven conductors 176', three (i.e., RGP-E, RGP-F and RGP-G) are employed on the interface board 88, while the other four (i.e., RGP-A, RGP-B, RGP-C and RGP-D) are connected to the connector 136 for interconnection with the connector 134 of the interface board 84 of FIGS. 3 and 6B.

In a similar manner as discussed above in connection with the interface board 86, nine interfaces 186 are provided by the interface board 88. Each of these interfaces 186 interfaces one of the three conductors 176' (i.e., RGP-E, RGP-F and RGP-G), one of the three even (i.e., ROW2-STAT, ROW4-STAT, ROW6-STAT) row status lines 116", and one of the three even (i.e., ROW2, ROW4, ROW6) row control lines 112". It will be appreciated that CB 26 and eight other circuit breakers 38 (e.g., even numbered circuit breakers numbered 28, 30, 32, 34, 36, 38, 40 and 42, none of which are shown) may be connected to the connectors 128, 220, 222, 224, 226, 228, 230, 232 and 234, respectively.

Figure 6A:
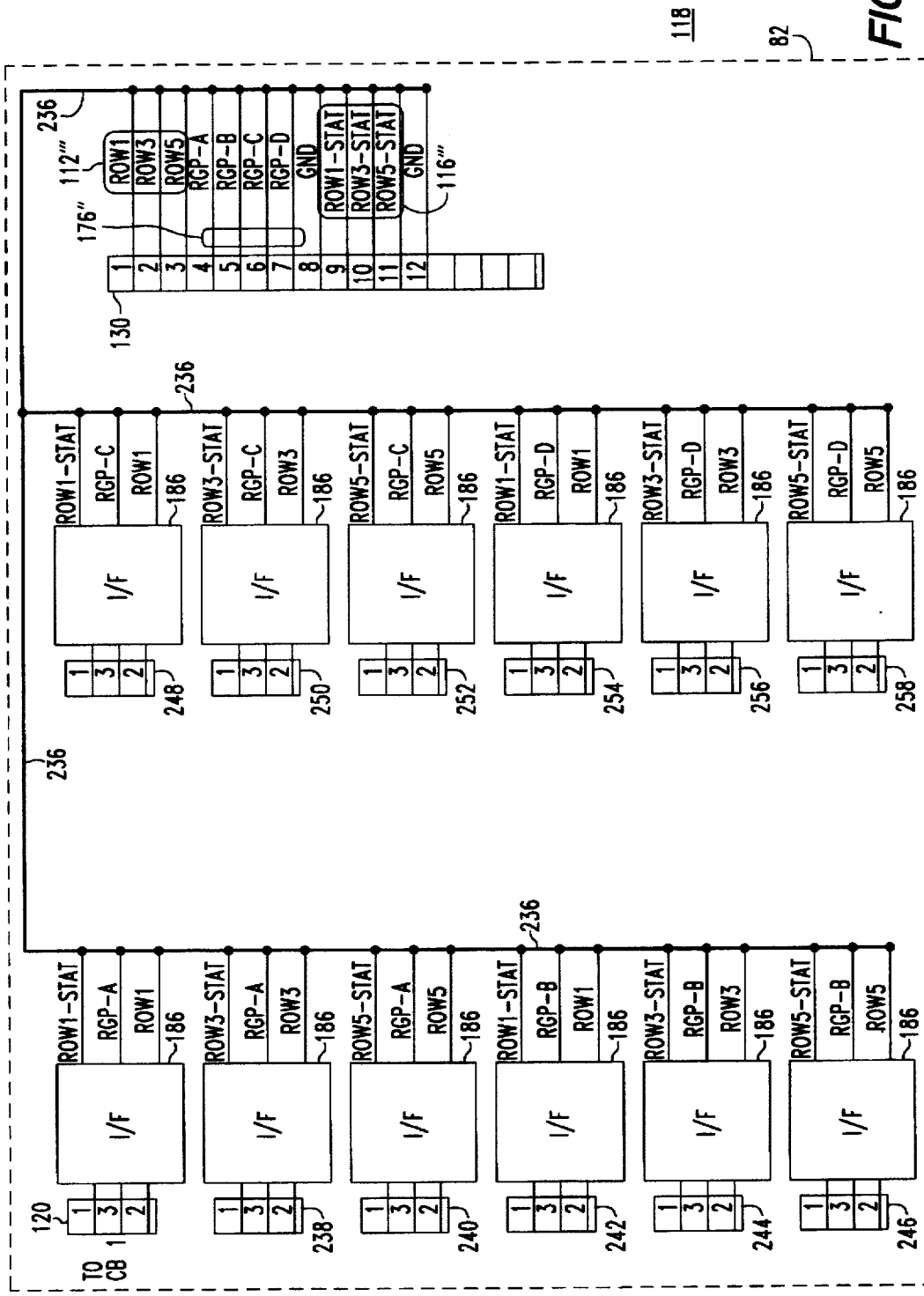
Figure 6B:
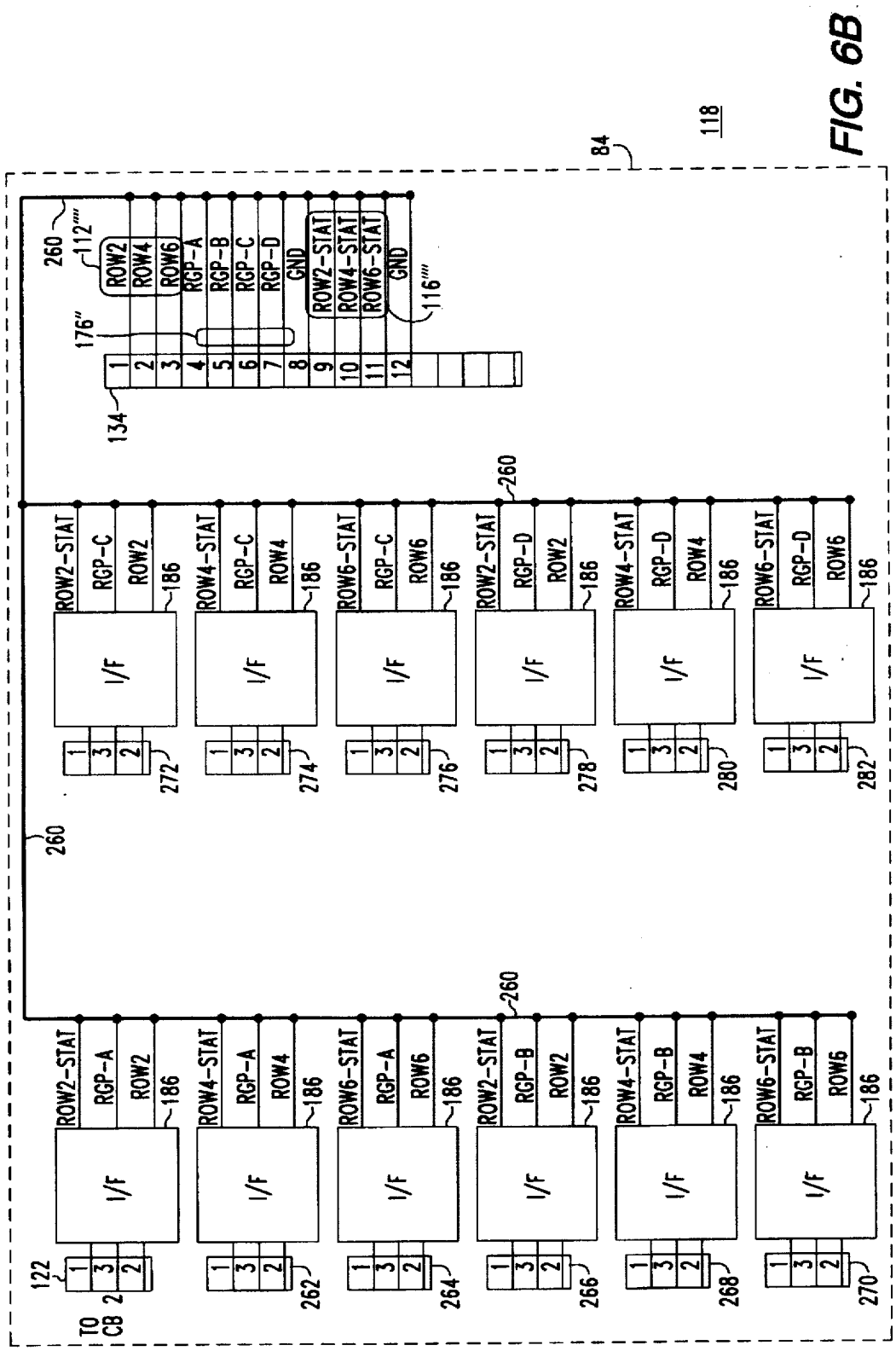

Referring to FIGS. 6A-6B, a schematic diagram illustrates the interface boards 82, 84 which form the interface 118. Each of the exemplary interface boards 82, 84 includes twelve interfaces (I/F) 186 and twelve connectors, such as the connector 120 which is connected to CB 1 of FIG. 3. The connector 130, which is interconnected with the connector 132 of FIG. 5A, provides a bus 236 which includes three odd (i.e., ROW1, ROW3, ROW5) row control lines 112''', three odd (i.e., ROW1-STAT, ROW3-STAT, ROW5-STAT) row status lines 116''', the GND line, and four conductors 176'' (i.e., RGP-A, RGP-B, RGP-C and RGP-D). It will be appreciated that CB 1 and eleven other circuit breakers 38 (e.g., CB 3 and CB 5 of FIG. 2, and other odd numbered circuit breakers numbered 7, 9, 11, 13, 15, 17, 19, 21 and 23, none of which are shown) may be connected to the connectors 120, 238, 240, 242, 244, 246, 248, 250, 252, 254, 256 and 258, respectively.

The connector 134 of the interface board 84, which is interconnected with the connector 136 of FIG. 4, provides a bus 260 which includes three even (i.e., ROW2, ROW4, ROW6) row control lines 112'''', three even (i.e., ROW2-STAT, ROW4-STAT, ROW6-STAT) row status lines 116'''', the GND line, and the four (i.e., RGP-A, RGP-B, RGP-C and RGP-D) conductors 176''.

In a similar manner as discussed above in connection with the interface board 82, twelve interfaces 186 are provided on the interface board 84. Each of these interfaces 186 interfaces one of the four conductors 176'' (i.e., RGP-A, RGP-B, RGP-C and RGP-D), one of the three even (i.e., ROW2-STAT, ROW4-STAT, ROW6-STAT) row status lines 116''''; and one of the three even (i.e., ROW2, ROW4, ROW6) row control lines 112''''. It will be appreciated that CB 2 and eleven other circuit breakers 38 (e.g., CB 4 and CB 6 of FIG. 2, and other even numbered circuit breakers numbered 8, 10, 12, 14, 16, 18, 20, 22 and 24, none of which are shown) may be connected to the connectors 122, 262, 264, 266, 268, 270, 272, 274, 276, 278, 280 and 282, respectively.

The exemplary interfaces 118, 124 of FIGS. 5A-5B, 6A-6B, respectively, interface up to 42 of the exemplary circuit breakers 38. It will be appreciated that in the event that only the interface 124 is employed, then up to 18 circuit breakers 38 may be interfaced. Similarly, in the event that only the interface 118 is employed in place of the interface 124, then up to 24 circuit breakers 38 may be interfaced. It will further be appreciated that a wide variety of other interfaces and modularities (e.g., 6, 12, 30, 36) may be employed using the exemplary seven group address lines 108 and exemplary six row address lines 112. For example, in place of the interface 124, another interface (not shown) for up to 12 circuit breakers 38 may be employed with the interface 118, thereby providing an interface of up to 30 total circuit breakers 38. It will still further be appreciated that a wide variety of other modularities of group address lines and row address and status lines may also be employed.

Figure 7:
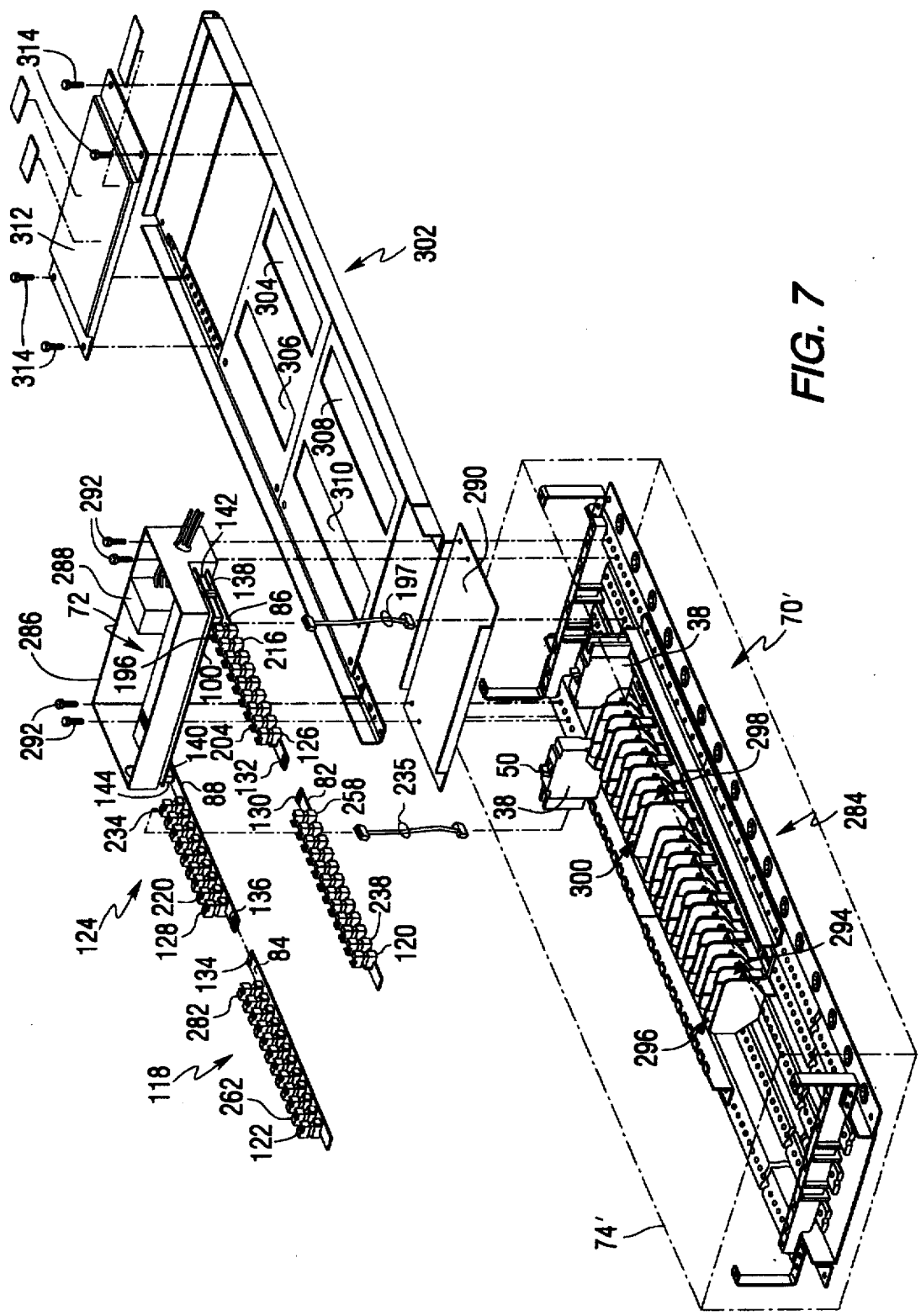
FIG. 7 is an exploded isometric view, with some parts not shown for clarity, of a panelboard in accordance with the invention.

FIG. 7 is an exploded isometric view, with some parts not shown for clarity, of a panelboard 70' similar to the panelboard 70 of FIG. 2. An exemplary chassis 284 holds in an enclosure 74', similar to the enclosure 74 of FIG. 2, up to thirty circuit breakers 38, of which two are shown. The two circuit breakers 38 of FIG. 7 are connected to the three conductor connectors 196, 234 by suitable three conductor cables 197, 235, respectively. The exemplary computer 72 includes printed circuit boards (not shown) housed within a housing 286 with a suitable power supply 288. The housing 286 and a base plate 290 are suitably secured to the chassis 284 by a plurality of fasteners 292. The interface 102 (shown in FIG. 3) of the computer 72 is connected to the connector 104 (shown in FIG. 3) of the row interface board 100. In this manner, the computer 72 and the row interface board 100 form an assembly suitable for use with a wide variety and/or combination of interfaces, such as the interface boards 82-88. It will be appreciated that different modularities of the circuit breakers 38 may be interfaced by employing appropriate interface boards while the computer 72 and the row interface board 100 remain generally constant. For example, in the configuration of FIG. 7, which employs up to 30 of the circuit breakers 38, the selection mechanism 98 of FIG. 3 would employ five jumpers (not shown) in the selection array 160 of FIG. 4 for the up to 30 circuit breakers 38 in place of the seven jumpers 174 of the selection array 164.

As a further example, in the case of up to 30 of the circuit breakers 38, the first of the circuit breakers 38 would be held toward the upper left corner (with respect to FIG. 2) of the chassis 284 at location 294, with the second of the circuit breakers 38 held toward the upper right corner of the chassis 284 at location 296. In this case, the location toward the upper left of the chassis 284 of the first one of the circuit breakers 38 is with respect to the interface board 82. In the case of up to 18 of the circuit breakers 38, the first of the circuit breakers 38 would be held toward the upper left corner of the chassis 284 at the location 298, with the second of the circuit breakers 38 held toward the upper right corner of the chassis 284 at the location 300. In this case, the location toward the upper left of the chassis 284 of the first one of the circuit breakers 38 is with respect to the interface board 86, and the selection mechanism 98 of FIG. 3 would employ three jumpers (not shown) in the selection array 156 of FIG. 4 for the up to 18 circuit breakers 38 in place of the seven jumpers 174 of the selection array 164.

The chassis 284 further includes an inner cover assembly 302 suitably secured thereto. The inner cover assembly 302 has a plurality of openings 304, 306, 308, 310 for accessing the handles 50 of the circuit breakers 38 therethrough. The inner cover assembly 302 includes a cover 312 for the computer housing 286. The cover 312 is suitably secured to the assembly 302 by a plurality of fasteners 314.

Figure 9:
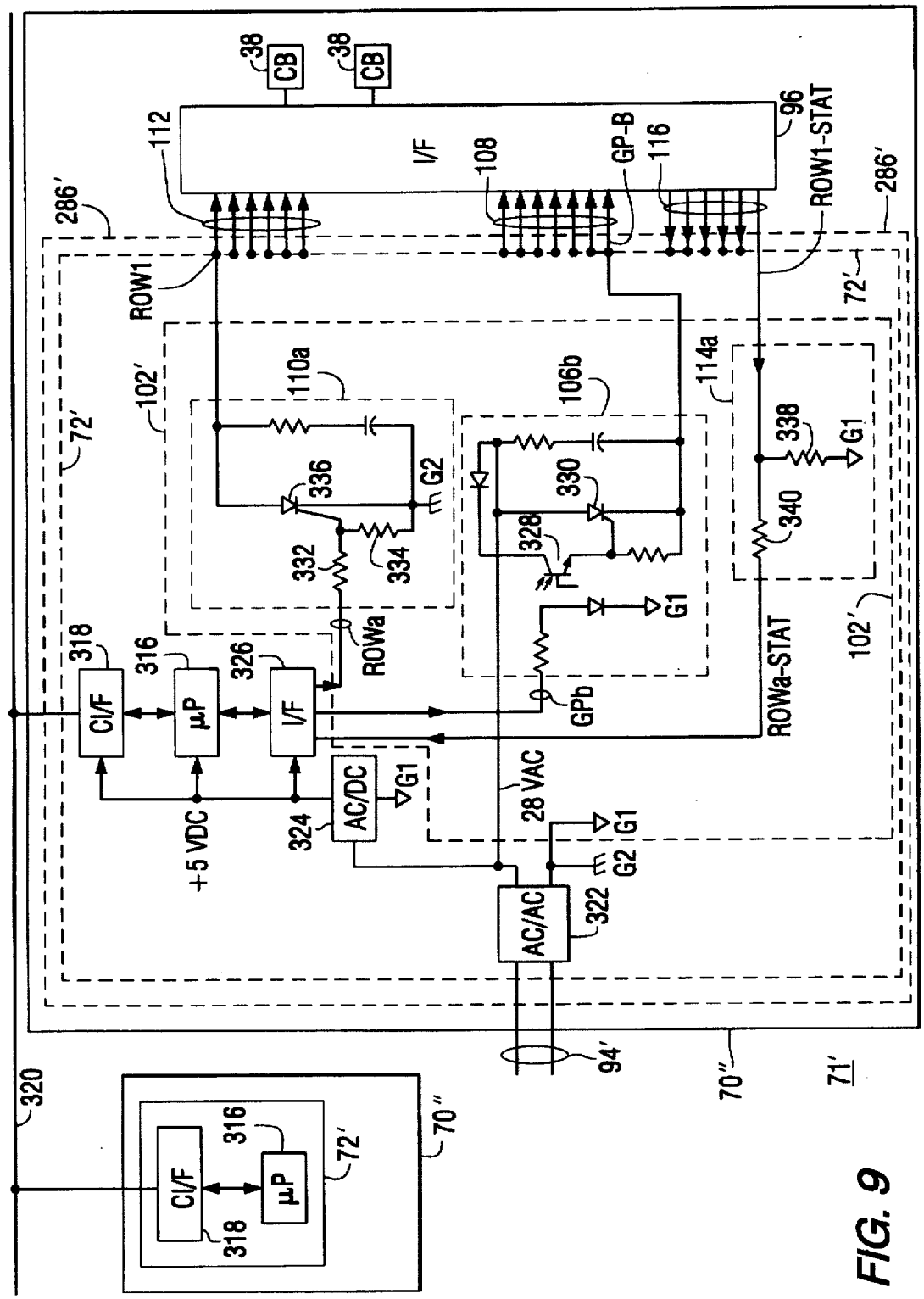
FIG. 9 is a block diagram of two panelboards in accordance with an alternative embodiment of the invention.

Referring to FIG. 9, a pair of panelboards 70", similar to the panelboard 70 of FIG. 2, are illustrated in an integrated building electrical load management system 71'. Each of the panelboards 70" includes a computer 72', similar to the computer 72 of FIG. 2. The computer 72' includes a microprocessor (μP) 316 and a communication interface (CI/F) 318 connected to a communication line, such as a communication bus, data channel, data network or data highway 320. As shown with the panelboard 70" on the right of FIG. 9, the computer housing 286' includes a power supply, such as an alternating current (AC) step down transformer (AC/AC) 322 connected to AC power line 94'. The power supply 322 provides an output voltage (e.g., about 28 VAC) referenced to grounds G1, G2 and powers an AC/direct current power supply (AC/DC) 324. The power supply 324 generally powers microprocessor 316, CI/F 318 and interface (I/F) 326 with a logic level voltage (e.g., about +5 VDC) generally referenced to the ground G1. The power supply 322 powers the power supply 324 and the interface 102', which is similar to the interface 102 of FIG. 2.

The power supplies 322, 324 provide suitable isolation for isolating the microprocessor 316 and the interface 102' from the power line 94'. The drivers 106, 110 and receivers 114 of the interface 102 of FIG. 3 also provide suitable isolation for isolating the compute 72 from the circuit breakers 38. As shown in FIG. 9, a driver 106b for one of the seven group address lines 108, a driver 110a for one of the six row control lines 112, and a receiver 114a for one of the six row status lines 116 are illustrated. The interface 326 is disposed between the microprocessor 316 and the drivers 106b, 110a and the receiver 114a. The interface 326 outputs a group address line GPb to driver 106b and a row control line ROWa to driver 110a, and also, inputs a row status line ROWa-STAT from receiver 114a. Those skilled in the art will appreciate that the other lines 108, 112, 116 are interfaced in a similar manner.

The group address line GPb, when active, drives an optical isolator 328 which, in turn, drives triac 330. The triac 330 sources the output of power supply 322 to the group address line GP-B. The row control line ROWa, when active, drives a divider formed by resistors 332, 334 which, in turn, drives triac 336. The triac 336, when driven, sinks current from the row control line ROW1 and through the solenoid 198 of one of the circuit breakers 38 as discussed above in connection with FIG. 5A. The row status line ROW1-STAT, when active, is suitably conditioned by a divider formed by resistors 338, 340 which, in turn, outputs the row status line ROWa-STAT to the interface 326.

The exemplary panelboards 70" support peer-to-peer communication therebetween without the requirement for communication through an external device and without requiring additions thereto other than the communication line 320. For example, the microprocessor 316 of the panelboard 70" on the right side of FIG. 9 directly communicates with other communication devices, such as the panelboard 70" on the left side of FIG. 9, through the communication interfaces 318 and the communication line 320.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A panelboard apparatus for use with a plurality of electrical switching apparatus at least some of which include remotely controllable actuating means for actuating said electrical switching apparatus and switching a circuit from a power line through a load, said panelboard apparatus comprising:

an enclosure;

at least one electrical switching apparatus;

means for holding in said enclosure one or more of said plurality of electrical switching apparatus including said at least one electrical switching apparatus;

control means for controlling one or more of said plurality of electrical switching apparatus including said actuating means of said at least one electrical switching apparatus;

connection means for connecting one or more of said plurality of electrical switching apparatus including said actuating means of said at least one electrical switching apparatus to said control means in one of a plurality of configurations, said connection means including at least one interface means having a plurality of interfaces for one of more of said plurality of electrical switching apparatus including said at least one electrical switching apparatus;

selection means for selecting one of said configurations in order to determine a location in the enclosure of a first one of said at least one electrical switching apparatus; and wherein said at least one interface means is a plurality of interface means each of which has a plurality of interfaces for at least some of said plurality of electrical switching apparatus, with a first interface means having a first plurality of interfaces for a first plurality of said plurality of electrical switching apparatus, and a second interface means having a second plurality of interfaces for a second plurality of said plurality of electrical switching apparatus, wherein said configurations include two configurations; wherein said location is with respect to said first interface means in said enclosure for one of said configurations, and is with respect to said second interface means in said enclosure for another one of said configurations.

2. The panelboard apparatus of claim 1 wherein said configurations include two configurations; wherein said location is with respect to said first interface means in said enclosure for one of said configurations, and is with respect to said second interface means in said enclosure for another one of said configurations.

3. The panelboard apparatus of claim 2 wherein said enclosure has an upper end and a lower end; wherein said control means is located toward the lower end of said enclosure; wherein said location is located toward the upper end of said enclosure; and wherein said second interface means is located generally between said first interface means and said control means in said enclosure.

4. The panelboard apparatus of claim 3 wherein said enclosure further has a left side and a fight side; wherein said means for holding holds up to about half of said plurality of electrical switching apparatus on each of said sides; and wherein said location is located toward one of said sides.

5. A panelboard apparatus for use with a plurality of electrical switching apparatus at least some of which include remotely controllable actuating means for actuating said electrical switching apparatus and switching a circuit from a power line through a load, said panelboard apparatus comprising:

an enclosure;

at least one electrical switching apparatus;

means for holding in said enclosure one or more of said plurality of electrical switching apparatus including said at least one electrical switching apparatus;

control means for controlling one or more of said plurality of electrical switching apparatus including said actuating means of said at least one electrical switching apparatus;

connection means for connecting one or more of said plurality of electrical switching apparatus including said actuating means of said at least one electrical switching apparatus to said control means in one of a plurality of configurations, said connection means including at least one interface means having a plurality of interfaces for one or more of at least some of said plurality of electrical switching apparatus including said at least one electrical switching apparatus;

selection means for selecting one of said configurations in order to determine a location in the enclosure of a first one of said at least one electrical switching apparatus; and wherein I and J are integers; wherein said control means includes means for addressing one or more of said plurality of electrical switching apparatus in I groups of J electrical switching apparatus; and wherein said connection means includes plural conductor means, one for each of said I groups.

6. The panelboard apparatus of claim 5 wherein said means for addressing includes I address lines; wherein each of said conductor means is a conductor for a corresponding one of said I address lines; and wherein said selection means includes switch means having at least one switch for at least one of said I address lines.

7. The panelboard apparatus of claim 6 wherein said conductors include I conductors; wherein a first one of said switch means selectively connects the first one of said I address lines to the last one of said I conductors; and wherein the second one of said switch means selectively connects the first two of said I address lines to the last two of said I conductors.

8. The panelboard apparatus of claim 7 wherein the second one of said switch means selectively connects the second one of said I address lines to the last one of said I conductors.

9. The panelboard apparatus of claim 7 wherein the last one of said switch means selectively connects said I address lines to said I conductors, with the first one of said I address lines connected to the first one of said I conductors, and the last one of said I address lines connected to the last one of said I conductors.

10. The panelboard apparatus of claim 5 wherein each of said switch means corresponds to one of said configurations, with the first one of said configurations having J electrical switching apparatus, and the second one of said configurations having 2J electrical switching apparatus.

11. The panelboard apparatus of claim 5 wherein said enclosure has two sides; wherein said means for holding holds up to about half of said plurality of electrical switching apparatus on each of said sides; wherein odd groups of said I groups of J electrical switching apparatus are located on one of said sides; and wherein even groups of said I groups of J electrical switching apparatus are located on the other of said sides.

12. The panelboard apparatus of claim 5 wherein said control means further includes processor means for controlling one or more of said plurality of electrical switching apparatus and power supply isolation means for isolating said processor means and said means for addressing from said power line.

13. The panelboard apparatus of claim 12 wherein said power supply isolation means includes first power supply means for powering said processor means and second power supply means for powering said means for addressing and said first power supply means.

14. A panelboard apparatus for use with a plurality of electrical switching apparatus at least some of which include remotely controllable actuating means for actuating said electrical switching apparatus and switching a circuit from a power line through a load, said panelboard apparatus comprising:

an enclosure;

at least one electrical switching apparatus;

means for holding in said enclosure one or more of said plurality of electrical switching apparatus including said at least one electrical switching apparatus;

control means for controlling up one or more of said plurality of electrical switching apparatus including said actuating means of said at least one electrical switching apparatus;

connection means for connecting one or more of said plurality of electrical switching apparatus including said actuating means of said at least one electrical switching apparatus to said control means in one of a plurality of configurations, said connection means including at least one interface means having a plurality of interfaces for one or more of at least some of said plurality of electrical switching apparatus including said at least one electrical switching apparatus;

selection means for selecting one of said configurations in order to determine a location in the enclosure of a first one of said at least one electrical switching apparatus; and wherein said at least one electrical switching apparatus is a plurality of circuit breakers.

15. A panelboard apparatus for use in an integrated building electrical load management system with a first plurality of electrical switching apparatus at least some of which include remotely controllable actuating means for actuating said electrical switching apparatus and switching a circuit from a power line through a load, said panelboard apparatus comprising:

an enclosure;

a second plurality of electrical switching apparatus, with said second plurality less than or equal to said first plurality;

means for holding in said enclosure one or more said first plurality of electrical switching apparatus including said second plurality of electrical switching apparatus;

control means for controlling one or more of said first plurality of electrical switching apparatus including said actuating means of said second plurality of electrical switching apparatus;

connection means for connecting one or more of said first plurality of electrical switching apparatus including said actuating means of said second plurality of electrical switching apparatus to said control means in one of a plurality of configurations, said connection means including at least one interface means having a plurality of interfaces for one or more of said first plurality of electrical switching apparatus including said second plurality of electrical switching apparatus; and selection means for selecting one of said configurations in order to determine a location in the enclosure of a first one of said second plurality of electrical switching apparatus; and wherein I and J are integers; wherein said plurality of configurations includes I configurations; wherein said control means includes means for addressing up to said first plurality of electrical switching apparatus in I groups of J electrical switching apparatus; wherein said selection means includes switch means for each of said I configurations; and wherein said at least one interface means is two interface means, with a first interface means having a plurality of interfaces to some of said first plurality of electrical switching apparatus, and a second interface means having a plurality of interfaces to the remainder of said first plurality of electrical switching apparatus.

16. The panelboard apparatus of claim 15 wherein K and L are integers, with K plus L equal to I; wherein said control means includes I address lines for addressing said I groups of J electrical switching apparatus; wherein said first interface means has a conductor for each of said I address lines from said control means to K groups of said first plurality of electrical switching apparatus; and wherein said second interface means has a conductor for L of said I address lines from said first interface means to L groups of said first plurality of electrical switching apparatus.

17. The panelboard apparatus of claim 16 wherein said conductors include I conductors; wherein said means for addressing includes I address lines; and wherein each of said switch means includes at least one switch for at least one of said I address lines, with a first one of said switch means selectively connecting the first one of said I address lines to the last one of said I conductors, and the second one of said switch means selectively connecting the first two of said I address lines to the last two of said I conductors.

18. A panelboard apparatus for use in an integrated building electrical load management system with a first plurality of electrical switching apparatus at least some of which include remotely controllable actuating means for actuating said electrical switching apparatus and switching a circuit from a power line through a load, said panelboard apparatus comprising:

an enclosure;

a second plurality of electrical switching apparatus, with said second plurality less than or equal to said first plurality;

means for holding in said enclosure one or more of said first plurality of electrical switching apparatus including said second plurality of electrical switching apparatus;

control means for controlling one or more of said first plurality of electrical switching apparatus including said actuating means of said second plurality of electrical switching apparatus;

connection means for connecting one or more of said first plurality of electrical switching apparatus including said actuating means of said second plurality of electrical switching apparatus to said control means in one of a plurality of configurations, said connection means including at least one interface means having a plurality of interfaces for one or more of of said first plurality of electrical switching apparatus including said second plurality of electrical switching apparatus;

selection means for selecting one of said configurations in order to determine a location in the enclosure of a first one of said second plurality of electrical switching apparatus; and wherein said integrated building electrical load management system includes a communication device and a communication line; and wherein said control means includes processor means and communication interface means for communicating with the communication device through the communication line.

* * * * *